US011572000B1

(12) United States Patent
Harvey

(10) Patent No.: US 11,572,000 B1
(45) Date of Patent: Feb. 7, 2023

(54) MODULAR AIRCRAFT SEATBACK COVER ATTACHMENT SYSTEM

(71) Applicant: B/E Aerospace, Inc., Winston-Salem, NC (US)

(72) Inventor: Delwyn Lovell Harvey, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/379,615

(22) Filed: Jul. 19, 2021

(51) Int. Cl.
*B64D 11/06* (2006.01)
*B60N 2/58* (2006.01)

(52) U.S. Cl.
CPC ......... *B60N 2/5825* (2013.01); *B60N 2/5833* (2013.01); *B60N 2/5841* (2013.01); *B64D 11/0647* (2014.12)

(58) Field of Classification Search
CPC . B60N 2/5841; B60N 2/5825; B64D 11/0647
See application file for complete search history.

(56) References Cited

U.S. PATENT DOCUMENTS

| | | | | |
|---|---|---|---|---|
| 4,789,201 | A | 12/1988 | Selbert | |
| 10,220,745 | B2 * | 3/2019 | Line | B60N 2/64 |
| 10,532,677 | B2 | 1/2020 | Line et al. | |
| 10,625,645 | B2 | 4/2020 | Baisch et al. | |
| 11,172,765 | B1 * | 11/2021 | Zurian | B64D 11/0647 |
| 2011/0298250 | A1 * | 12/2011 | Line | B60R 11/0235 |
| | | | | 297/217.3 |
| 2014/0300171 | A1 | 10/2014 | Velasco et al. | |
| 2017/0368971 | A1 * | 12/2017 | Matsushima | B60N 2/682 |
| 2018/0111529 | A1 * | 4/2018 | Taguchi | B60N 2/5816 |
| 2018/0279791 | A1 * | 10/2018 | Iwakata | B60R 22/26 |
| 2021/0245641 | A1 * | 8/2021 | Hallock | B60N 2/5825 |

FOREIGN PATENT DOCUMENTS

| | | | | |
|---|---|---|---|---|
| CN | 112298026 | A * | 2/2021 | |
| DE | 202011002719 | U1 | 4/2011 | |
| DE | 102015102895 | A1 | 9/2015 | |
| DE | 102017125535 | A1 * | 5/2018 | B60N 2/58 |
| EP | 1876053 | A2 * | 1/2008 | B60N 2/242 |
| EP | 3219537 | B1 | 5/2021 | |
| EP | 3696014 | B1 | 3/2022 | |
| FR | 2604427 | B1 | 10/1992 | |
| GB | 1131107 | A | 10/1968 | |
| WO | WO-2020128444 | A1 * | 6/2020 | B33Y 80/00 |
| WO | 2020169447 | A1 | 8/2020 | |
| WO | WO-2020204877 | A1 * | 10/2020 | B32B 15/043 |

\* cited by examiner

*Primary Examiner* — Timothy J Brindley
(74) *Attorney, Agent, or Firm* — Suiter Swantz pc llo

(57) ABSTRACT

A modular seatback cover attachment system is disclosed. The modular seatback cover attachment system may include one or more trim caps including one or more tabs configured to reversibly couple the one or more trim caps to one or more portions of a seatback frame. The one or more tabs may include at least one of one or more hook tabs or one or more panel tabs. The modular seatback cover attachment system may include an interlocking assembly configured to interlock the one or more trim caps when the one or more trim caps are coupled to the seatback frame. The modular seatback cover attachment system may include a fastening assembly configured to couple the one or more trim caps to a portion of the dress cover.

14 Claims, 17 Drawing Sheets

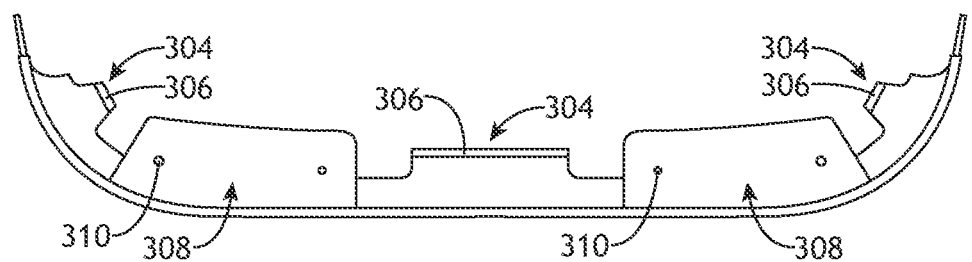
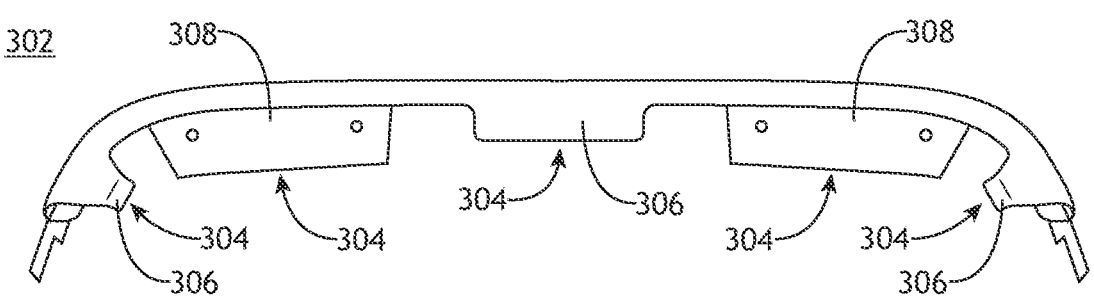
FIG.4B

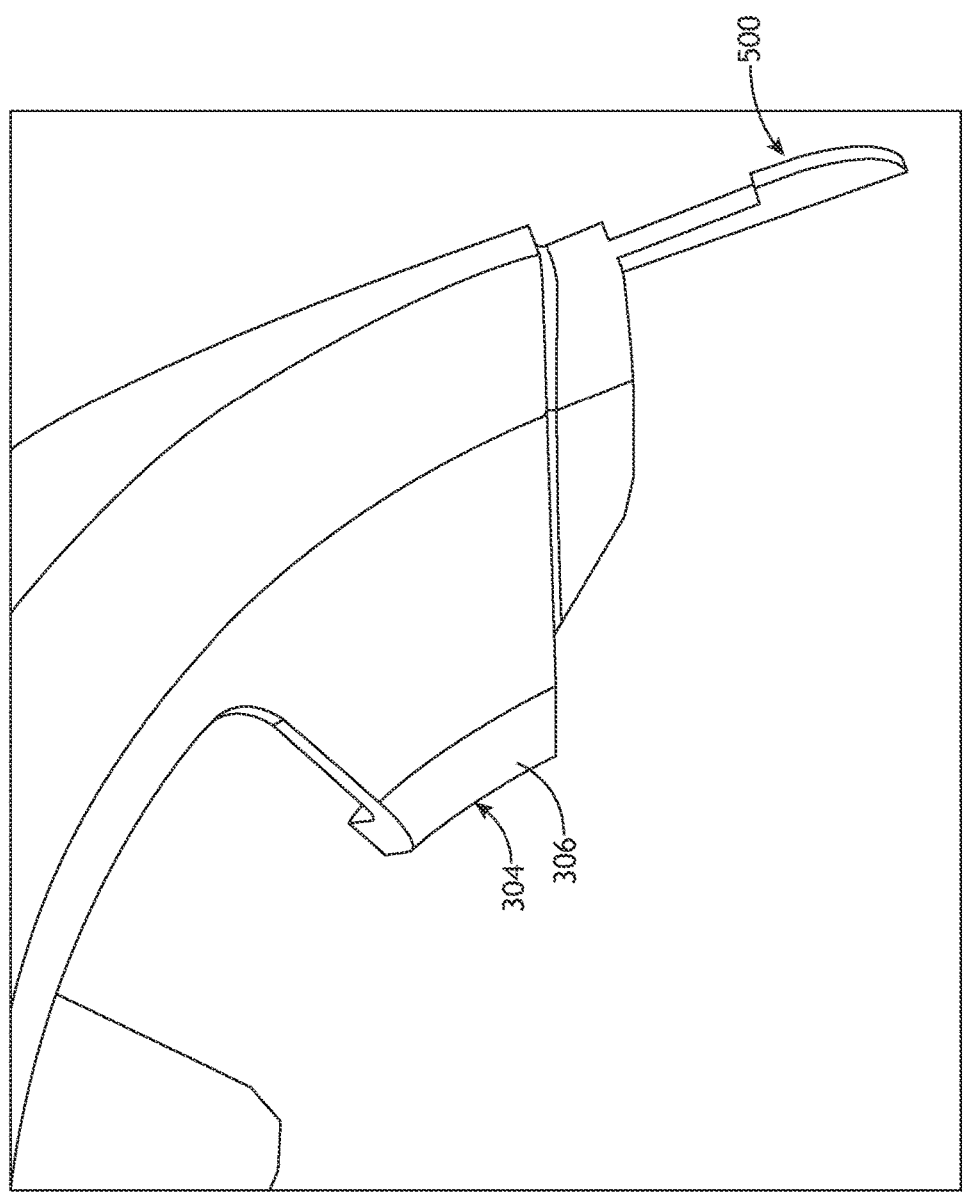

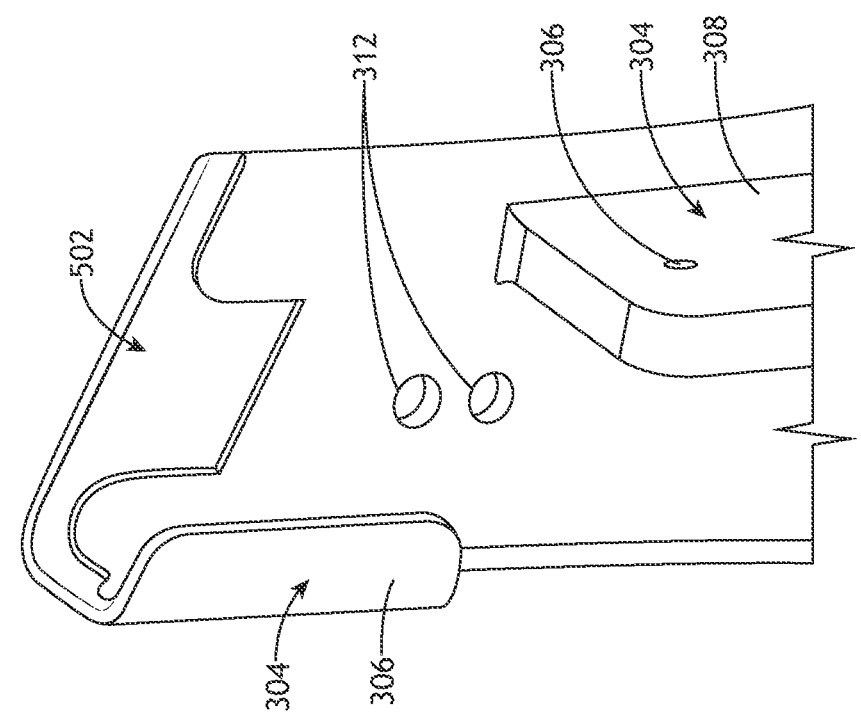

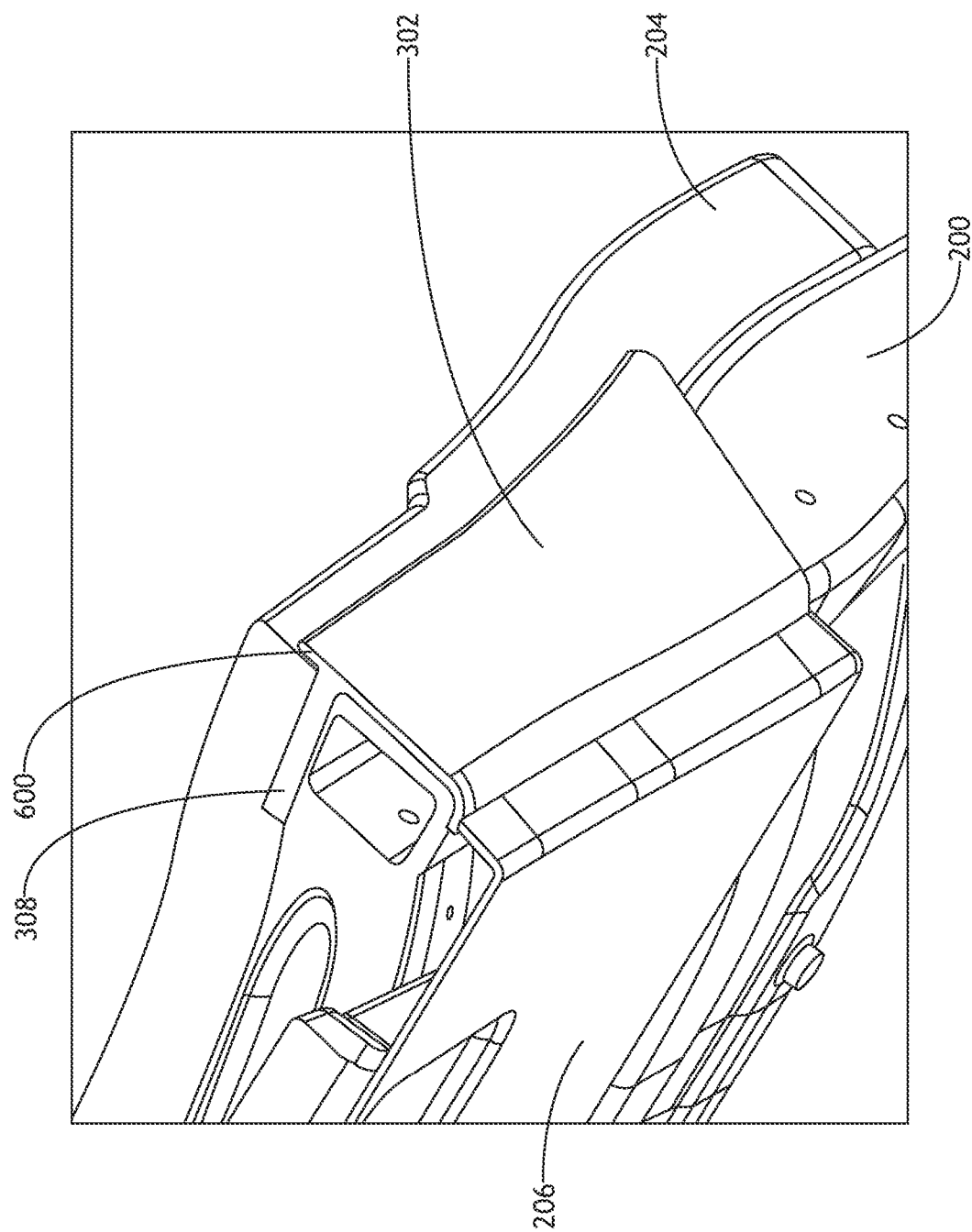

MODULAR AIRCRAFT SEATBACK COVER ATTACHMENT SYSTEM

BACKGROUND

Seats may include components such as a seatback cover, a seatback cushion, and seatback support system. Additionally, in some designs, the seats may include additional components such as a seat pan cover, a seat pan cushion, and a seat pan support system. The components may be coupled together with one or more attachment assemblies. In addition, in select industries the build of the seat (and any included components within the build) may be required to meet guidelines and/or standards.

SUMMARY

An aircraft seat is disclosed, in accordance with one or more embodiments of the present disclosure. The aircraft seat includes a base assembly couplable to a floor of an aircraft cabin. The aircraft seat includes a seat frame coupled to the base assembly, the seat frame including a seatback frame and a seat pan frame. The aircraft seat includes a seat pan dress cover including at least one surface configured to conform to a corresponding surface of the seat pan frame. The aircraft seat includes a seatback dress cover including at least one surface configured to conform to a corresponding surface of the seatback frame. The aircraft seat includes a modular seatback cover attachment system configured to couple the seatback dress cover to a portion of the seatback frame. The modular seatback cover attachment system including one or more trim caps, the one or more trim caps including one or more tabs configured to reversibly couple the one or more trim caps to one or more portions of a seatback frame, the one or more tabs including at least one of one or more hook tabs or one or more panel tabs. The modular seatback cover attachment system including an interlocking assembly, the interlocking assembly configured to interlock the one or more trim caps when the one or more trim caps are coupled to seatback frame. The modular seatback cover attachment system including a fastening assembly configured to couple the one or more trim caps to a portion of the seatback dress cover.

In some embodiments, the one or more trim caps may include at least one of a first side trim cap configured to couple to a first side portion of the seatback frame, a second side trim cap configured to couple to a second side portion of the seatback frame, and a top trim cap configured to couple to a top portion of the seat.

In some embodiments, the one or more tabs may include one or more hook tabs along a rear surface of the one or more trim caps and one or more panel tabs along a front surface of the one or more trim caps.

In some embodiments, the one or more hook tabs and the one or more panels may be offset.

In some embodiments, the one or more trim caps may be configured to engage with the seatback frame via a force applied in a direction inward.

In some embodiments, the fastener assembly may include a hook-and-loop assembly.

In some embodiments, the one or more panel tabs may include one or more rivet holes, the one or more rivet holes configured to couple a portion of the hook-and-loop assembly to the one or more panel tabs of the one or more trim caps.

In some embodiments, a first portion of the hook-and-loop assembly may be couplable to the one or more panel tabs via the one or more rivet holes and a second portion of the hook-and-loop assembly may be couplable to the seatback dress cover.

In some embodiments, the one or more trim caps may be formed of a plastic.

In some embodiments, the seatback dress cover may include a seatback cover layer and a seatback cushion layer, the seatback cushion layer being integrated with the seatback cover layer.

In some embodiments, the interlocking assembly may include a tab-and-groove assembly configured to interlock the one or more trim caps when the one or more trim caps are coupled to the seatback frame.

In some embodiments, the tab-and-groove assembly may include one or more tabs, a first tab of the one or more tabs positioned on a first end of a first trim cap and a second tab of the one or more tabs positioned on a second end of the first trim cap.

In some embodiments, the tab-and-groove assembly may include one or more grooves, a first groove of the one or more grooves positioned on an end of a second trim cap and a second groove of the one or more grooves positioned on an end of a third trim cap, the first tab on the first end of the first trim cap configured to interlock with the first groove on the end of the second trim cap, the second tab on the second end of the first trim cap configured to interlock with the second groove on the end of the third trim cab.

In some embodiments, the one or more trim caps may include a flange along a front edge of the trim cap, the flange configured to overlap with a portion of the seatback dress cover to prevent an edge of the seatback dress cover from being unintentionally removed.

A modular seatback cover attachment system is disclosed, in accordance with one or more embodiments of the present disclosure. The modular seatback cover attachment system includes one or more trim caps, the one or more trim caps including one or more tabs configured to reversibly couple the one or more trim caps to one or more portions of a seatback frame, the one or more tabs including at least one of one or more hook tabs or one or more panel tabs. The modular seatback cover attachment system includes an interlocking assembly, the interlocking assembly configured to interlock the one or more trim caps when the one or more trim caps are coupled to the seatback frame. The modular seatback cover attachment system includes a fastening assembly configured to couple the one or more trim caps to a portion of the dress cover.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4B illustrates an isolated view of one or more trim caps of the modular seatback cover attachment system, in accordance with one or more embodiments of the disclosure;

FIG. 5B illustrates an isolated view of one or more trim caps of the modular seatback cover attachment system, in accordance with one or more embodiments of the disclosure;

FIG. 5C illustrates an isolated view of one or more trim caps of the modular seatback cover attachment system, in accordance with one or more embodiments of the disclosure;

FIG. 6 illustrates a cross sectional view of the aircraft seatback including the modular seatback cover attachment system, in accordance with one or more embodiments of the disclosure.

DETAILED DESCRIPTION OF THE INVENTION

Figure 1:
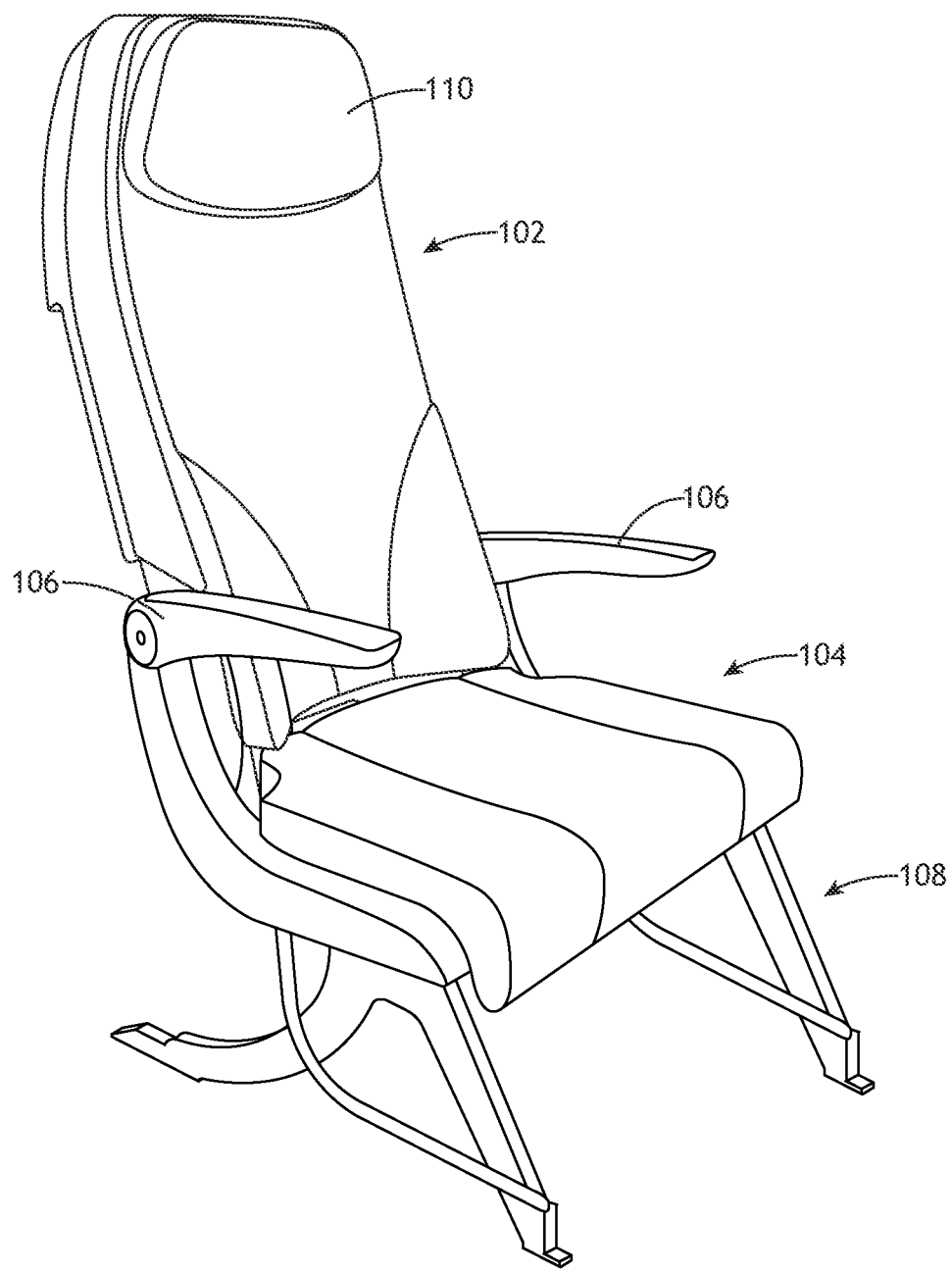
FIG. 1 illustrates a perspective view of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-7 in general illustrate a modular seatback cover attachment system for an aircraft seat, in accordance with one or more embodiments of the disclosure.

Seats may include some combination of components such as, but not limited to, a seat pan dress cover, a seatback dress cover, a seat pan cushion, a seatback cushion, a seat pan support system, a seatback support system, and a seatback bezel. In select seat designs, the seatback dress cover alone may be composed of numerous pieces, where each piece is then coupled together to form the seatback dress cover. After the individual components are assembled, the seat components may be coupled together with one or more attachment assemblies to form the aircraft seat. For example, the seatback dress cover may be coupled to the seatback bezel to form the seatback of the aircraft seat. For instance, the seatback dress cover may be tucked within a gap between the seatback bezel and the seatback frame to retain the seatback dress cover within the gap. Often the gap between the seatback bezel and the seatback frame is narrow, which makes tucking the seatback dress cover in the narrow gap difficult. Further, the gap between the seatback bezel and the seatback frame may be wide, such that the seatback dress cover is not retained within the gap. As such, this method of attachment results in the seatback dress cover from becoming disengaged or fraying at the edges due to variation in the size of the gap between the seatback and the bezel, the dress cover hem thickness/type, and the like.

Further, the seatback cover may be subjected to stress, strain, dirt or other mess such as airsickness, contraband, or the like resulting in damage of the seatback cover. After a period of time and/or a particular type of wear factor occurring, the seatback cover may need to be removed for cleaning and/or replacement. However, removing the seatback cover may require tools and be labor/time intensive. The removal and re-installation process for the seatback cover should be quick, inexpensive, and not labor intensive. For example, the seatback cover attachment system should be quickly dismantled and put together without incurring considerable labor costs and without requiring special tools.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. Seatback cover attachment systems may present difficulties such as, but not limited to, failing to meet load requirements (e.g., 9 g static load requirements or 16 g dynamic load requirements), burn requirements, or the like as set forth by the FAA in 14 C.F.R. Part 25, AIRWORTHINESS STANDARDS: TRANSPORT CATEGORY AIRPLANES).

As such, it would be desirable to provide a modular seatback cover attachment system. The modular seatback cover attachment system should provide a long-term solution for seatback dress cover retention. The modular seatback cover attachment system should be configured to retain various dress covers, whether for a retrofitted aircraft seat or a new aircraft seat design. The modular seatback cover attachment system should eliminate the need to tuck dress covers into a gap between the bezel and the seatback frame. The modular seatback cover attachment system should act as a rub strip on the aircraft seat to take wear (e.g., suitcases, galley carts, or the like). The modular seatback cover attachment system should be quick to install/remove and be tool-less. The modular seatback cover attachment system should be configured in accordance with aviation guidelines and/or standards.

Referring in general to FIGS. 1-7, one or more modular seatback cover attachment systems may be integrated within an aircraft seat 100 installed within an aircraft cabin. For example, the aircraft seat 100 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 100 may be actuatable (e.g., translatable and/or rotatable) from the TTL position to a non-TTL position, and/or vice versa. Further, it is noted the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 100 may be translatable (e.g., trackable or slidable). The aircraft seat 100 may be rotatable about an axis cross-wise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a seatback 102. The aircraft seat 100 may include a seat pan 104. The aircraft seat 100 may include one or more arms 106. The aircraft seat 100 may be coupled to a base 108. The base 108 may be couplable to a floor of an aircraft cabin.

The seatback 102 may include a headrest 110. For example, the headrest 110 may be integrated within the seatback 102. By way of another example, the headrest may be a separate component coupled to (or inserted into) the seatback 102. For instance, the headrest may be movable relative to the seatback frame of the aircraft seat 100 (e.g., adjustable, removable, or the like.

Referring to FIG. 1, the aircraft seat 100 may include a seat frame couplable to the base assembly 108. The seat frame may include a seat pan frame. For example, a seat pan cover may include at least one surface configured to conform to a corresponding surface of the seat pan frame.

Figure 2A:
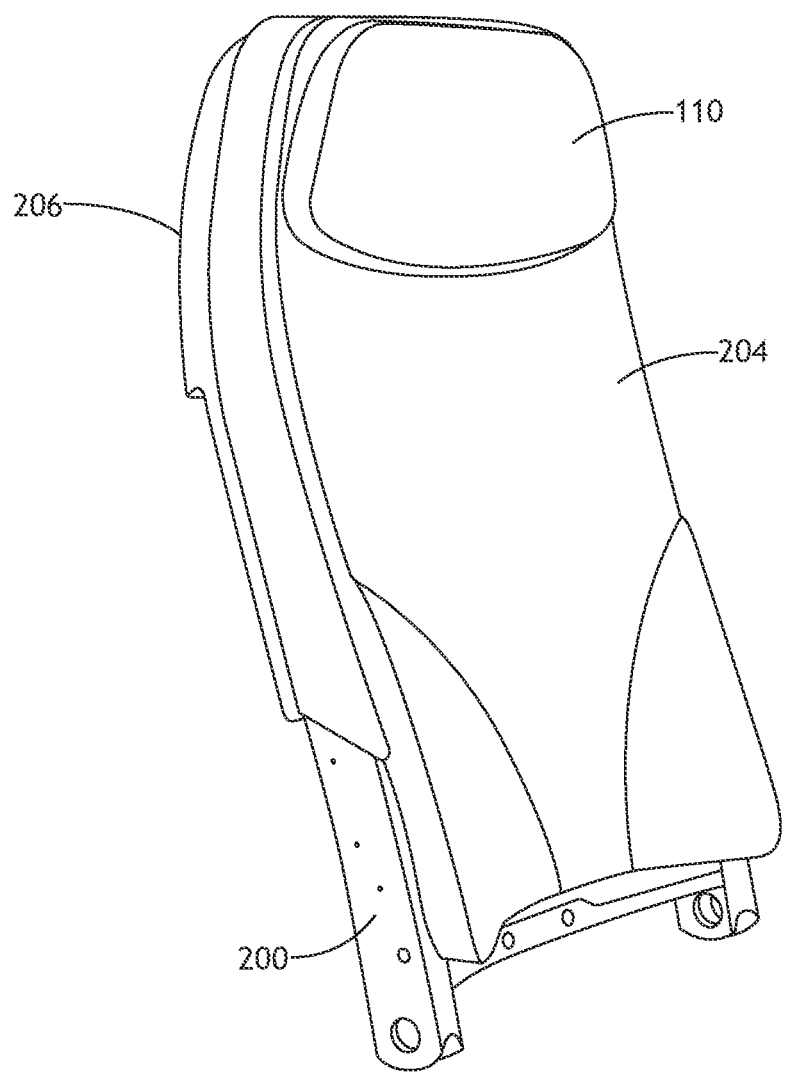
FIG. 2A illustrates a perspective view of an aircraft seatback including a modular seatback cover attachment system, in accordance with one or more embodiments of the disclosure.
Figure 2B:
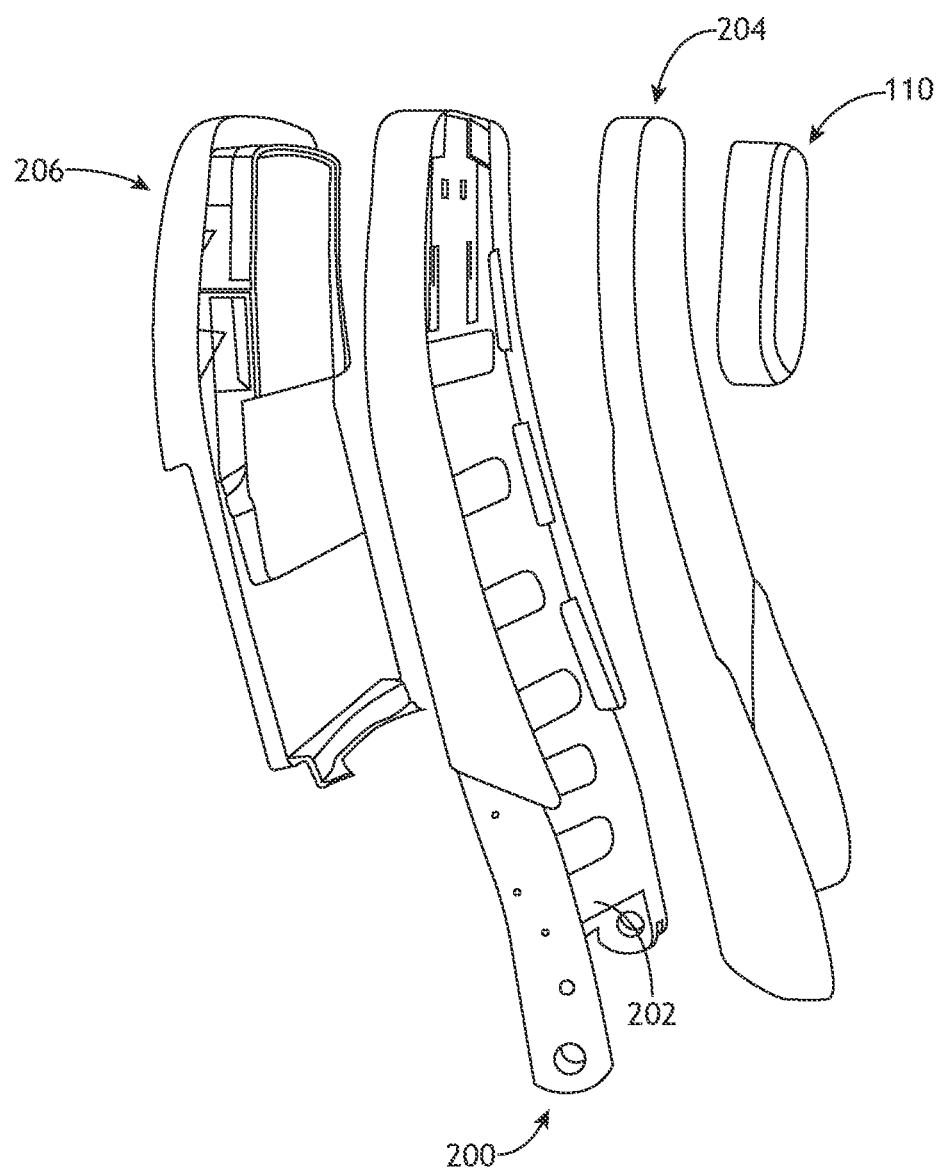
FIG. 2B illustrates an exploded perspective view of the aircraft seatback including the modular seatback cover attachment system, in accordance with one or more embodiments of the disclosure.
Figure 2C:
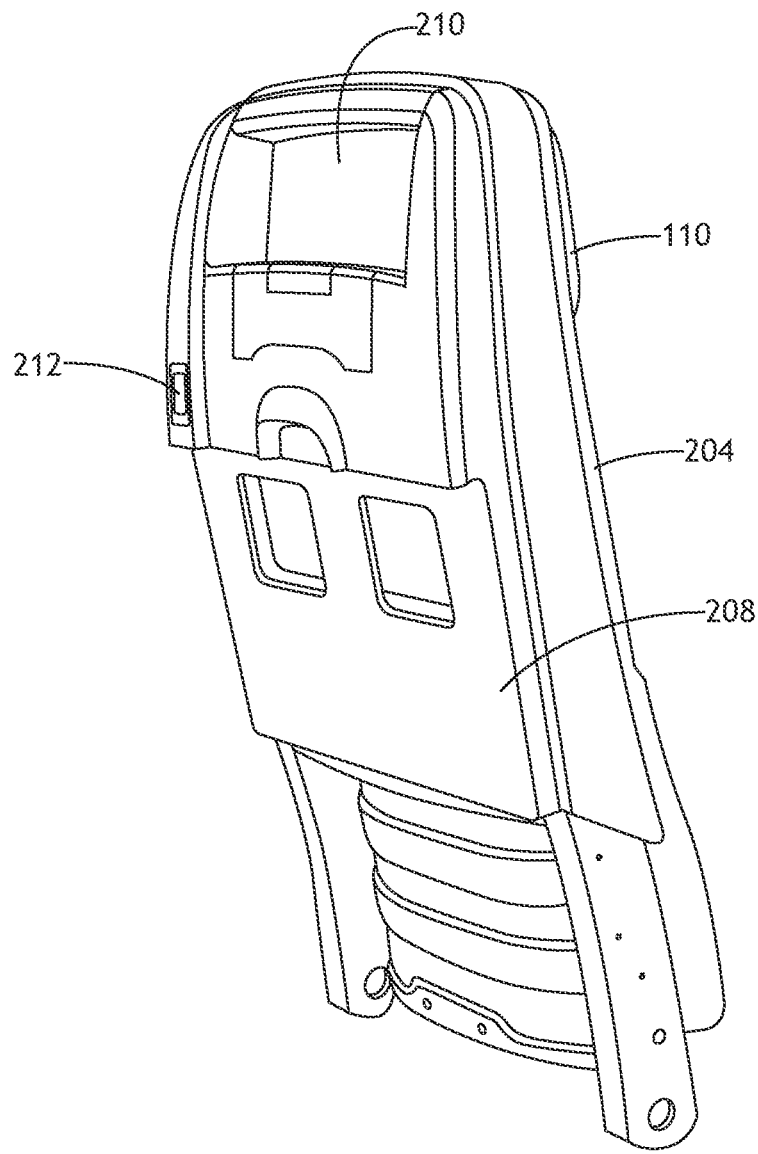
FIG. 2C illustrates a rear perspective view of the aircraft seatback including the modular seatback cover attachment system, in accordance with one or more embodiments of the disclosure.
Figure 2D:
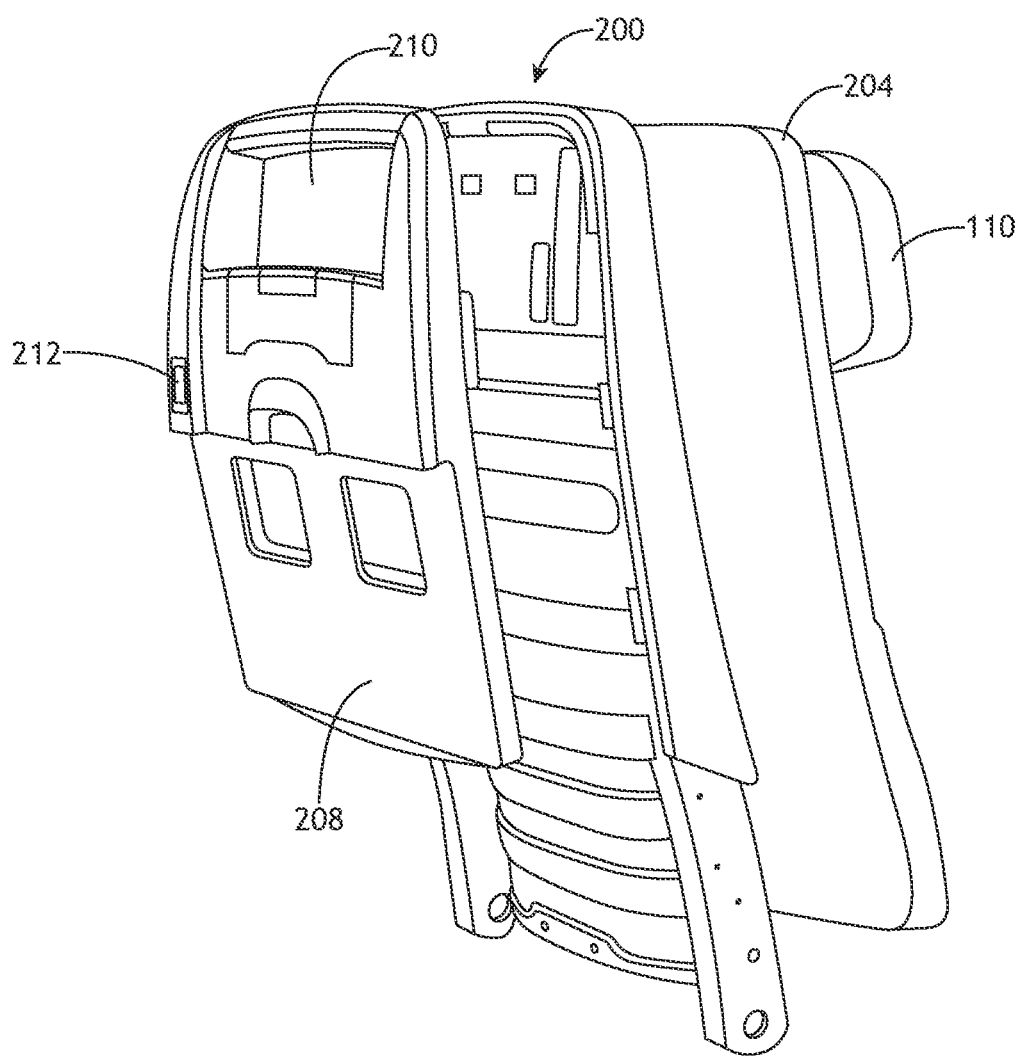
FIG. 2D illustrates an exploded rear perspective view of the aircraft seatback including the modular seatback cover attachment system, in accordance with one or more embodiments of the disclosure.

Referring to FIGS. 2B and 2D, the seat frame may include a seatback frame 200 including one or more seatback frame elements 202. For example, one or more seatback frame elements 202 may include, but are not limited to, seatback structural hoops. The seatback frame 200 including the one or more seatback frame elements 202 may form a portion of an exterior boundary of the seatback 102 of the aircraft seat 100.

The aircraft seat 100 may include a seatback dress cover 204 including a seatback cushion, where the seatback dress cover 204 includes at least one surface configured to conform to a corresponding surface of the seatback frame 200. For example, the seatback 102 may include an integrated seatback dress cover and cushion. The seatback dress cover 204 may be configured to fit over at least a portion of the seatback cushion. For example, the seatback dress cover 204 may be configured to wrap around or otherwise enclose exterior surfaces of the seatback cushion not proximate to the seatback frame 200. The seatback dress cover 204 may be configured to attach to the seatback frame 200 and/or the cushion. It is noted "seat cover" and "dress cover" may be considered equivalent, for purposes of the disclosure.

The seatback cushion may conform or substantially conform to the seatback frame 200. For example, at least one surface of the seatback cushion may conform to a corresponding surface of the seatback frame 200. By way of another example, components of the seatback frame 200 may extend beyond the boundaries of the seatback cushion, such that the at least one surface of the seatback cushion does not fully conform to the corresponding surface of the seatback frame 200. By way of another example, a portion of the seatback cushion may wrap around or otherwise enclose a portion of the seatback frame 200. In general, the seatback frame 200 may conform to a portion of a user (e.g., a passenger, a crew member, or the like), and the seatback cushion may similarly conform to the portion of the user due to the seatback cushion conforming to the seatback frame 200.

It is noted the dress cover 204 may conform to a portion of a user (e.g., a passenger, a crew member, or the like), or may be independently-shaped. Further, it is noted that the dress cover 204 may be formed of any material known in the art including, but not limited to, leather, synthetic leather, fabric, or the like. Additionally, it is noted that the cushion may be formed of any material known in the art including, but not limited to, foam, or the like.

The seatback cushion may be integrated with the dress cover 204. For example, the dress cover 204 may be formed of a laminated piece of material integrated with a cushion backing (e.g., a foam backed fabric). It is noted that the cushion may be integrated with the seatback cover 204 via any fabrication process (e.g., sewing, or the like) or fastening mechanism (e.g., an adhesive, or the like). In this regard, the modular seatback cover attachment system 300 may include an integrated seatback cover and cushion assembly to eliminate the need for an additional seatback cushion component, thereby reducing the assembly time by reducing the number of seatback component parts.

Although embodiments of the disclosure illustrate the dress cover 204 including a cushion, it is noted the seatback cushion may be separate from the dress cover 204 (e.g., where a cushion layer is separately installed on the aircraft seat 100) and/or the seatback cushion may not be installed on the aircraft seat 100. Therefore, the above description should not be interpreted as a limitation on the present disclosure but merely an illustration.

The seatback 102 may include a seatback bezel 206 configured to couple to a portion of the seatback frame 200. The seatback bezel 206 may include, but is not required to include, a cavity 208 for storing a food tray, a storage compartment 210, a charging port or headphone jack 212, and the like. Further, the seatback bezel 206 may include an in-flight entertainment (IFE) device coupled to a surface of the seatback bezel 206 (e.g., in an actuatable or a fixed position).

The cavity 208 may be defined by one or more surfaces of the bezel 206. For example, the cavity 208 may be configured to store a food tray during TTL or non-TTL stages of flight. For instance, the bezel 206 may include a latch configured to securely store the food tray in the stowed position within the cavity 208 during TTL or non-TTL stages of flight.

Referring to FIGS. 3A-3D, the seatback 102 may include a modular seatback attachment cover system 300 configured to couple the dress cover 204 to the seatback frame 200. The modular seatback attachment system 300 may be configured to couple to at least a portion of the seatback frame 200. It is noted that "modular seatback cover attachment system" and variants including, but not limited to, "seatback cover attachment system", "attachment system" or "system" may be considered equivalent, for purposes of the disclosure.

The modular seatback cover attachment system 300 may include one or more trim caps 302. For example, the one or more trim caps 302 may include a first trim cap 302a configured to couple to a first portion 200a of the seatback frame 200. For instance, the first trim cap 302a may be a left trim cap 302a configured to couple to a left portion 200a of the seatback frame 200. By way of another example, the one or more trim caps 302 may include a second trim cap 302b configured to couple to a second portion 200b of the seatback frame 200. For instance, the second trim cap 302b may be a right trim cap 302b configured to couple to a right portion 200b of the seatback frame 200. By way of another example, the one or more trim caps 302 may include a third trim cap 302c configured to couple to a third portion 200c of the seatback frame 200. For instance, the third trim cap 302c may be a top trim cap 302c configured to couple to a top portion 200c of the seatback frame 200.

The one or more trim caps 302 may be shaped to conform to a surface of the seatback frame 200. For example, the one or more trim caps 302 may be fabricated to complement the shape of the corresponding portion of the seatback frame 200. In one instance, the left trim cap 302a may be fabricated to complement the shape of the left portion 200a of the seatback frame 200. In another instance, the right trim cap 302b may be fabricated to complement the shape of the right portion 200b of the seatback frame 200. In another instance, the top trim cap 302c may be fabricated to complement the shape of the top portion 200c of the seatback frame 200. In this regard, the modular seatback attachment system 300 may be self-aligning, such that the one or more trim caps 302 may be configured to self-align with a select portion of the seatback frame 200. It is noted that the self-aligning trim caps 302 may be configured to ensure that the modular seatback attachment system 300 is correctly installed on the seatback frame 200 to correctly attach the seatback dress cover 204.

Although FIGS. 3A-3D depict the modular seatback cover attachment system 300 including a specific number and configuration of trim caps 302, it is noted that the modular seatback cover attachment system 300 may include any number and configuration of trim caps 302. For example, the modular seatback cover attachment system 300 may include a single trim cap 302 configured to couple the dress cover 204 to the seatback frame 200. By way of another example, the modular seatback cover attachment system 300 may include two trim caps 302, where the first trim cap 302 and the second trim cap 302 may be configured to couple the dress cover 204 to the seatback frame 200. Therefore, FIGS. 3A-3D are provided merely for illustrative purposes and shall not be construed as limiting the scope of the present disclosure.

Referring to FIGS. 4A-6, the one or more trim caps 302 may include one or more tabs 304. For example, the one or more trim caps 302 may include a first tab 304a, a second tab 304b, a third tab 304c, a fourth tab 304d, a fifth tab 304e, a sixth tab 304f, up to an N number of tabs. Although FIGS. 3A-5A depict the modular seatback cover attachment system 300 including a specific number and configuration (e.g., location, shape, size, or the like) of tabs 304, it is noted that the modular seatback cover attachment system 300 may include any number and configuration of tabs 304. Therefore, FIGS. 3A-5A are provided merely for illustrative purposes and shall not be construed as limiting the scope of the present disclosure.

The one or more tabs 304 may include one or more hook tabs 306 along one or more surfaces of the one or more trim caps 302. For example, as shown in FIGS. 3A-3D, the one or more hook tabs 306 may be positioned along a rear/back surface of the one or more trim caps 302. In one instance, the one or more trim caps 302 may include a first hook tab 306a positioned along a first rear surface of the one or more trim caps 302. In another instance, the one or more trim caps 302 may include a second hook tab 306b positioned along a second rear surface of the one or more trim caps 302. In another instance, the one or more trim caps 302 may include a third hook tab 306c positioned along a third rear surface of the one or more trim caps 302.

By way of another example, although not shown in FIGS. 3A-3D, the one or more hook tabs 306 may be positioned along a front surface of the one or more trim caps 302. In one instance, the one or more trim caps 302 may include a first hook tab 306a positioned along a first front surface of the one or more trim caps 302. In another instance, the one or more trim caps 302 may include a second hook tab 306b positioned along a second front surface of the one or more trim caps 302. In another instance, the one or more trim caps 302 may include a third hook tab 306c positioned along a third front surface of the one or more trim caps 302.

By way of another example, although not shown in FIGS. 3A-3D, the one or more hook tabs 306 may be positioned along a rear/back surface of the one or more trim caps 302 and a front surface of the one or more trim caps. In one instance, the one or more trim caps 302 may include a first hook tab positioned along a first rear surface of the one or more trim caps 302. In another instance, the one or more trim caps 302 may include a second hook tab positioned along a second rear surface of the one or more trim caps 302. In another instance, the one or more trim caps 302 may include a third hook tab positioned along a third rear surface of the one or more trim caps 302. In another instance, the one or more trim caps 302 may include a fourth hook tab positioned along a first front surface of the one or more trim caps 302. In another instance, the one or more trim caps 302 may include a fifth hook tab positioned along a second front surface of the one or more trim caps 302. In another instance, the one or more trim caps 302 may include a sixth hook tab positioned along a third front surface of the one or more trim caps 302.

The one or more tabs 304 may include one or more panel tabs 308 (i.e., flat tabs) along one or more surfaces of the one or more trim caps 302. For example, as shown in FIGS. 3A-3D, the one or more panel tabs 308 may be positioned along a front surface of the one or more trim caps 302. In one instance, the one or more trim caps 302 may include a first panel tab 308a positioned along a first front surface of the one or more trim caps 302. In another instance, the one or more trim caps 302 may include a second panel tab 308b positioned along a second front surface of the one or more trim caps 302. In another instance, the one or more trim caps 302 may include a third panel tab 308c positioned along a third front surface of the one or more trim caps 302.

By way of another example, although not shown in FIGS. 3A-3D, the one or more panel tabs 308 may be positioned along a back/rear surface of the one or more trim caps 302. In one instance, the one or more trim caps 302 may include a first panel tab positioned along a first rear surface of the one or more trim caps 302. In another instance, the one or more trim caps 302 may include a second panel tab positioned along a second rear surface of the one or more trim caps 302. In another instance, the one or more trim caps 302 may include a third panel tab positioned along a third rear surface of the one or more trim caps 302.

By way of another example, although not shown in FIGS. 3A-3D, the one or more hook tabs 306 and the one or more panel tabs 308 may be positioned along a rear/back surface of the one or more trim caps 302 and a front surface of the one or more trim caps 302. In one instance, the one or more trim caps 302 may include a first hook tab positioned along a first rear surface of the one or more trim caps 302. In another instance, the one or more trim caps 302 may include a first panel tab positioned along a second rear surface of the one or more trim caps 302. In another instance, the one or more trim caps 302 may include a second hook tab positioned along a third rear surface of the one or more trim caps 302. In another instance, the one or more trim caps 302 may include a second panel tab positioned along a first front surface of the one or more trim caps 302. In another instance, the one or more trim caps 302 may include a third hook tab positioned along a second front surface of the one or more trim caps 302. In another instance, the one or more trim caps 302 may include a third panel tab positioned along a third front surface of the one or more trim caps 302.

By way of another example, although not shown in FIGS. 3A-3D, the one or more hook tabs 306 and the one or more panel tabs 308 may be positioned along a rear/back surface of the one or more trim caps 302 and a front surface of the one or more trim caps 302. In one instance, the one or more trim caps 302 may include a first panel tab positioned along a first rear surface of the one or more trim caps 302. In another instance, the one or more trim caps 302 may include a first hook tab positioned along a second rear surface of the one or more trim caps 302. In another instance, the one or more trim caps 302 may include a second panel tab positioned along a third rear surface of the one or more trim caps 302. In another instance, the one or more trim caps 302 may include a second hook tab positioned along a first front surface of the one or more trim caps 302. In another instance, the one or more trim caps 302 may include a third panel tab positioned along a second front surface of the one or more trim caps 302. In another instance, the one or more trim caps 302 may include a third hook tab positioned along a third front surface of the one or more trim caps 302.

By way of another example, although not shown in FIGS. 3A-3D, the one or more hook tabs 306 and the one or more panel tabs 308 may be positioned along a rear/back surface of the one or more trim caps 302. In one instance, the one or more trim caps 302 may include a first panel tab (or hook tab) positioned along a first rear surface of the one or more trim caps 302. In another instance, the one or more trim caps 302 may include a first hook tab (or panel tab) positioned along a second rear surface of the one or more trim caps 302. In another instance, the one or more trim caps 302 may include a second panel tab (or hook tab) positioned along a third rear surface of the one or more trim caps 302.

By way of another example, although not shown in FIGS. 3A-3D, the one or more hook tabs 306 and the one or more panel tabs 308 may be positioned along a front surface of the one or more trim caps 302. In one instance, the one or more trim caps 302 may include a first hook tab (or panel tab) positioned along a first front surface of the one or more trim caps 302. In another instance, the one or more trim caps 302 may include a first panel tab (or hook tab) positioned along a second front surface of the one or more trim caps 302. In another instance, the one or more trim caps 302 may include a second hook tab (or panel tab) positioned along a third front surface of the one or more trim caps 302.

The one or more tabs 304 may be positioned in an offset configuration along the surface of the one or more trim caps 302. For example, the one or more tabs 304 along the rear surface of the one or more trim caps 302 may be positioned offset from the one or more tabs 304 along the front surface of the one or more trim caps 302. In this regard, the offset configuration allows for the one or more tabs 304 to be easily fabricated, such that the offset configuration allows for two-way direction action in the fabrication tool. Additionally, the offset configuration helps to ensure that the one or more trim caps 302 are configured to flex when installed on the seatback frame 200 to allow for quick and easy installation.

Figure 3A:
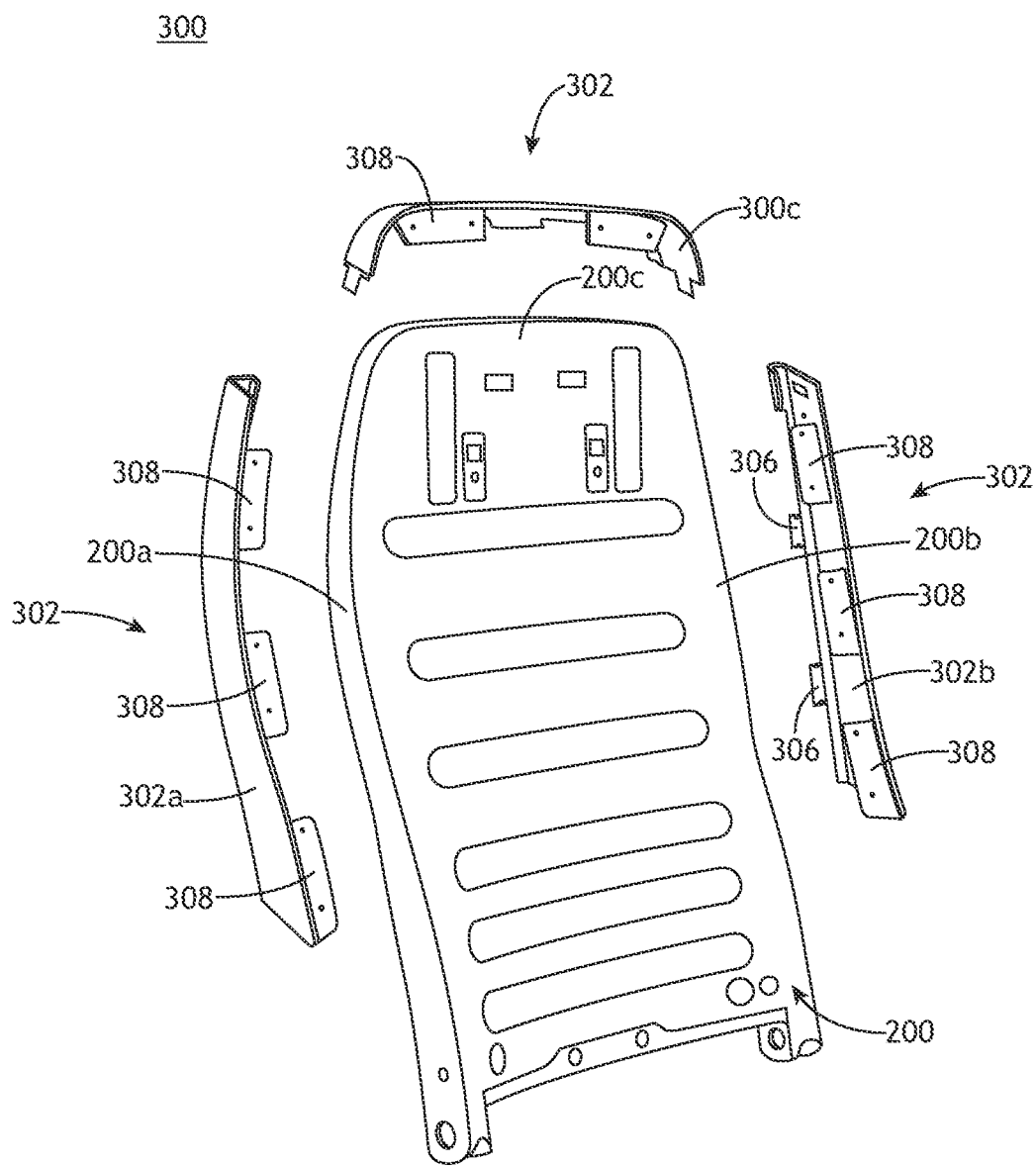
FIG. 3A illustrates an exploded perspective view of the aircraft seatback including the modular seatback cover attachment system, in accordance with one or more embodiments of the disclosure.
Figure 3B:
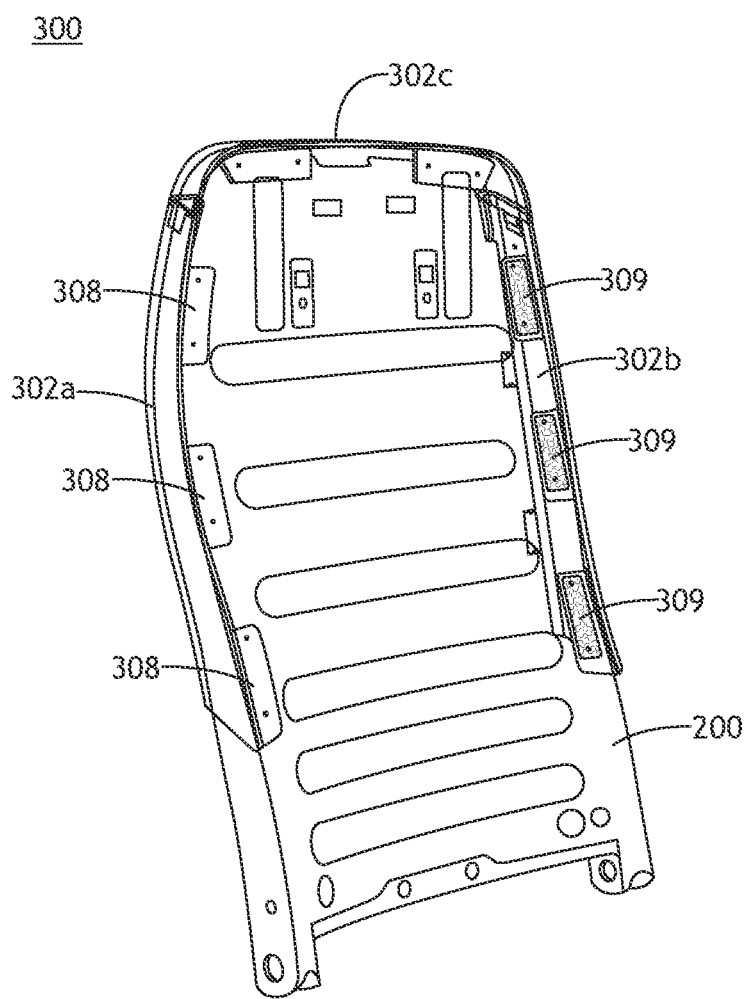
FIG. 3B illustrates a perspective view of the aircraft seatback including the modular seatback cover attachment system, in accordance with one or more embodiments of the disclosure.
Figure 3C:
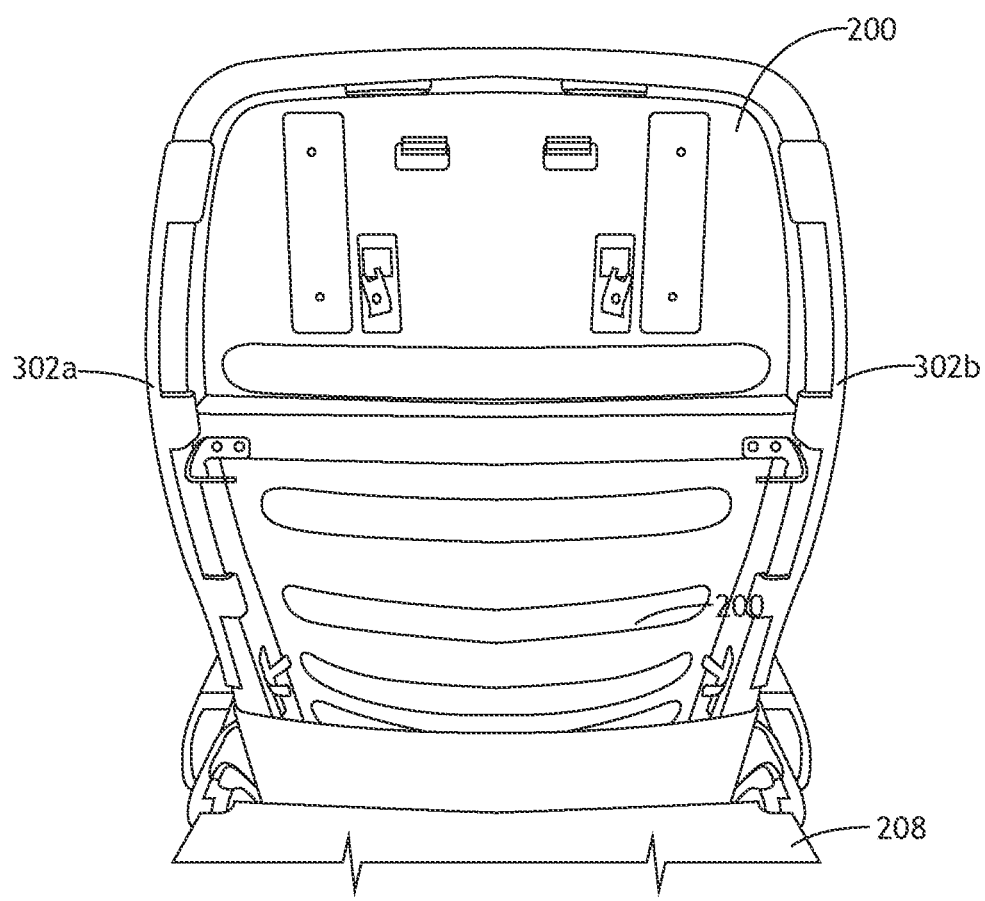
FIG. 3C illustrates a rear perspective view of the aircraft seatback including the modular seatback cover attachment system, in accordance with one or more embodiments of the disclosure.

The modular seatback cover attachment system 300 may include one or more fasteners 309 to couple the dress cover 204 to a portion of the modular seatback cover attachment system 300. For example, as shown in FIG. 3B, the one or more fasteners may include one or more hook-and-loop fasteners. For instance, the one or more panels 308 may be configured to couple to the one or more hook-and-loop fasteners via one or more rivet holes 310. In this regard, a first side (e.g., hook side or loop side) of the one or more hook-and-loop fasteners may be coupled to a front surface of the one or more panel tabs 308 via the one or more rivet holes 310 and corresponding second side (e.g., loop side or hook side) of the one or more hook-and-loop fasteners may be coupled to a back surface of the dress cover 204, such that by coupling the first side to the second side the dress cover 204 may be fastened to the seatback frame 200 via the modular seatback cover attachment system 300.

By way of another example, the one or more fasteners may include one or more snaps (or buttons). For instance, the one or more panels 308 may be configured to couple to the one or more snaps (or buttons). In this regard, a first side of the one or more snaps (or buttons) may be coupled to a front surface of the one or more panel tabs 308 and corresponding second side of the one or more snaps (or buttons) may be coupled to a back surface of the dress cover 204, such that by coupling the first side to the second side, the dress cover 204 may be fastened to the seatback frame 200 via the modular seatback cover attachment system 300.

By way of another example, the one or more fasteners may include one or more zippers. For instance, the one or more trim caps 302 may be configured to couple to the one or more zippers. In this regard, a first portion of the zipper may be coupled (e.g., sewn) to a portion of the one or more trim caps 302 and a second portion of the zipper may be coupled (e.g., sewn) to a portion of the dress cover 204, such that when the zipper portions are zipped together the dress cover 204 may be fastened to the seatback frame 200 via the seatback cover attachment system 300.

Figure 3D:
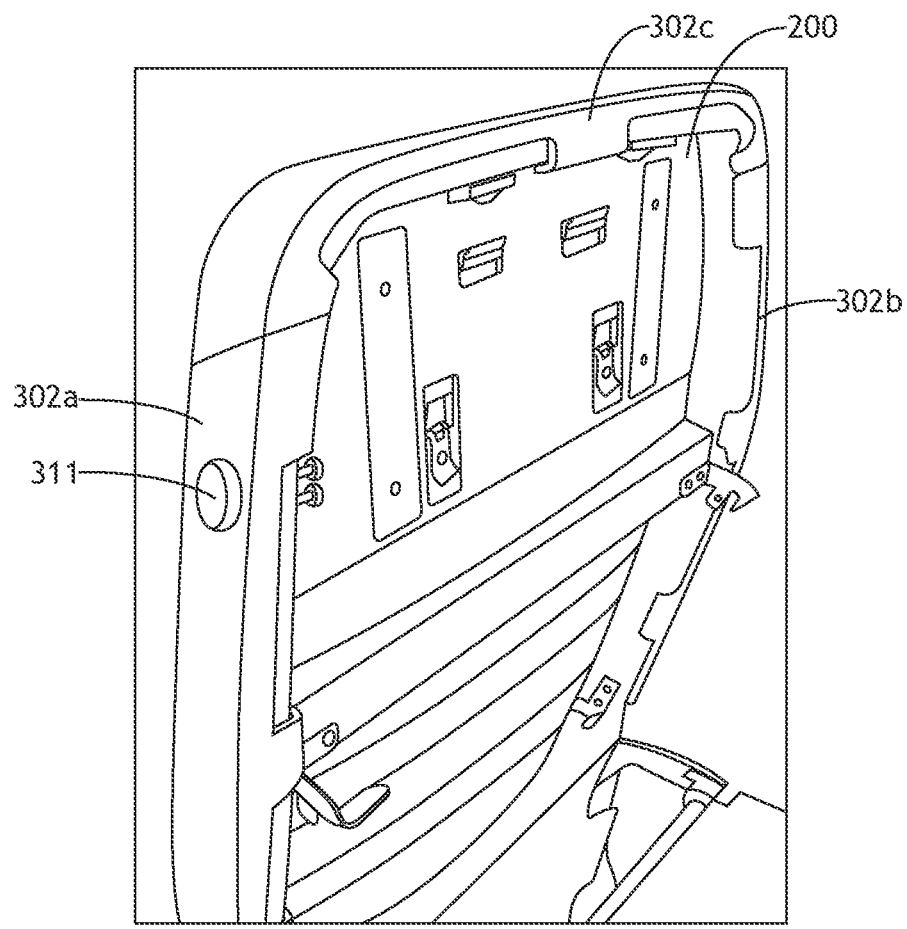
FIG. 3D illustrates a side perspective view of the aircraft seatback including the modular seatback cover attachment system, in accordance with one or more embodiments of the disclosure.
Figure 4A:
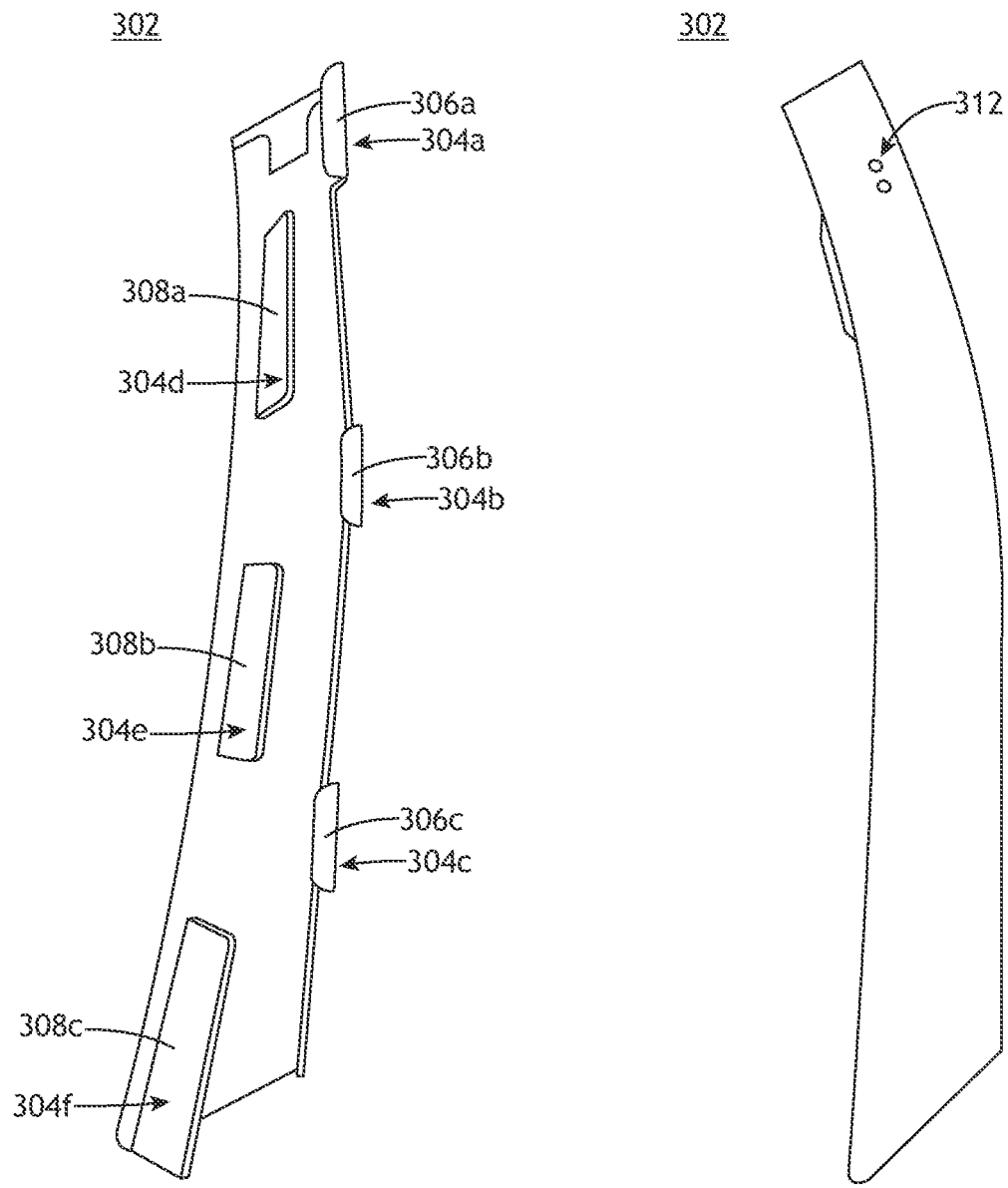
FIG. 4A illustrates an isolated view of one or more trim caps of the modular seatback cover attachment system, in accordance with one or more embodiments of the disclosure.
Figure 5A:
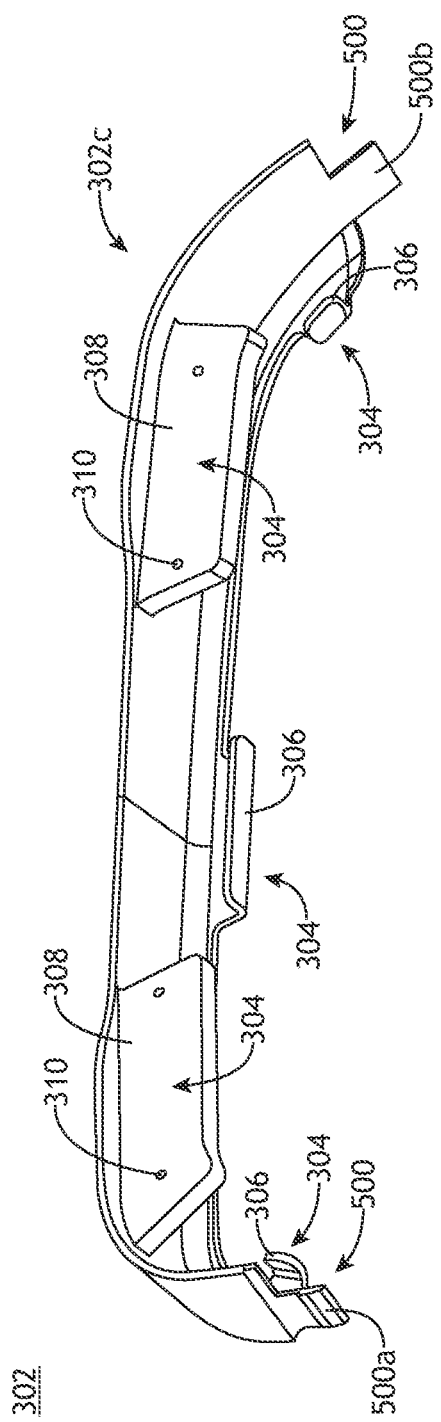
FIG. 5A illustrates an isolated view of one or more trim caps of the modular seatback cover attachment system, in accordance with one or more embodiments of the disclosure.
Figure 5D:
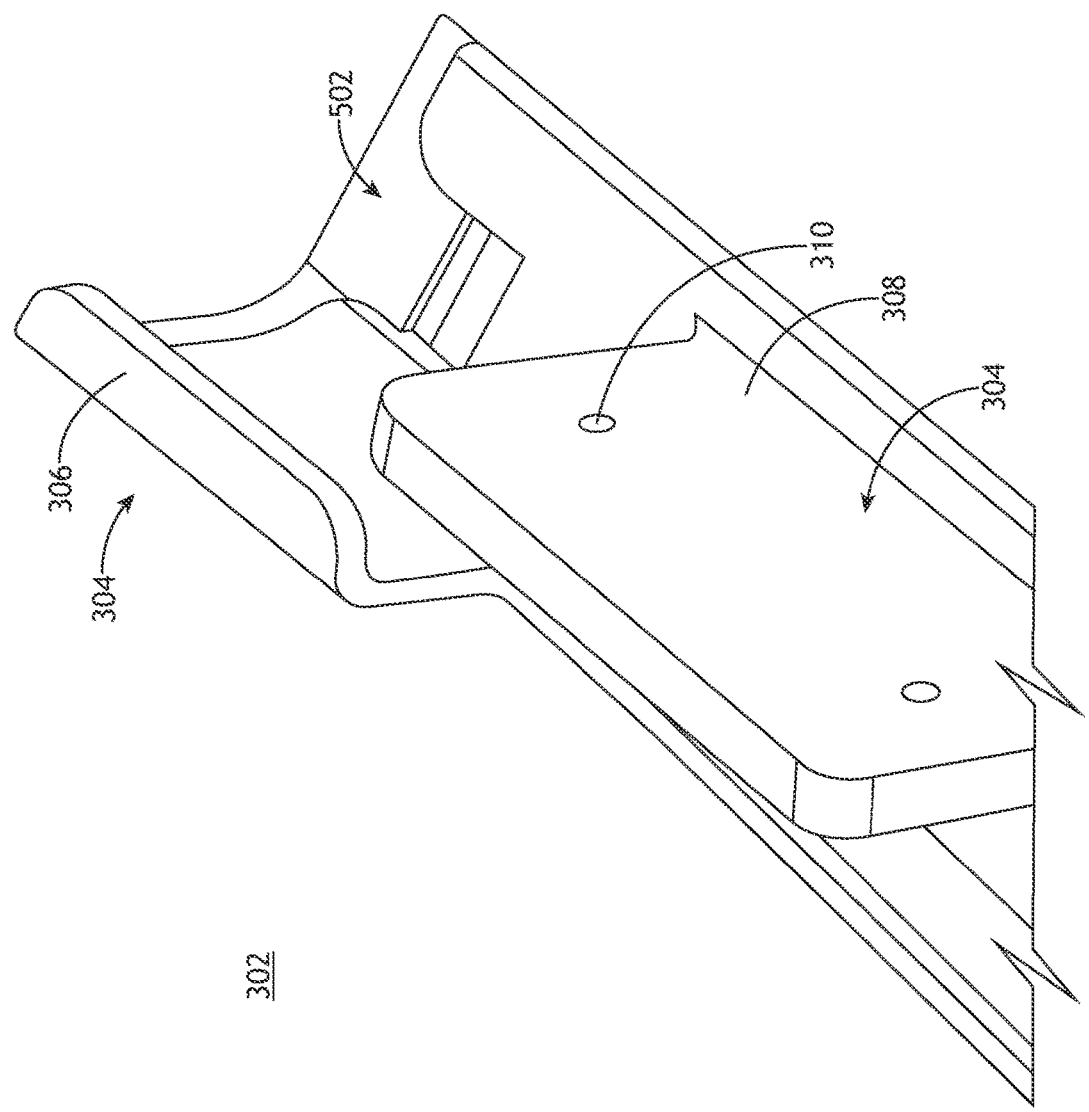
FIG. 5D illustrates an isolated view of one or more trim caps of the modular seatback cover attachment system, in accordance with one or more embodiments of the disclosure.
Figure 7:
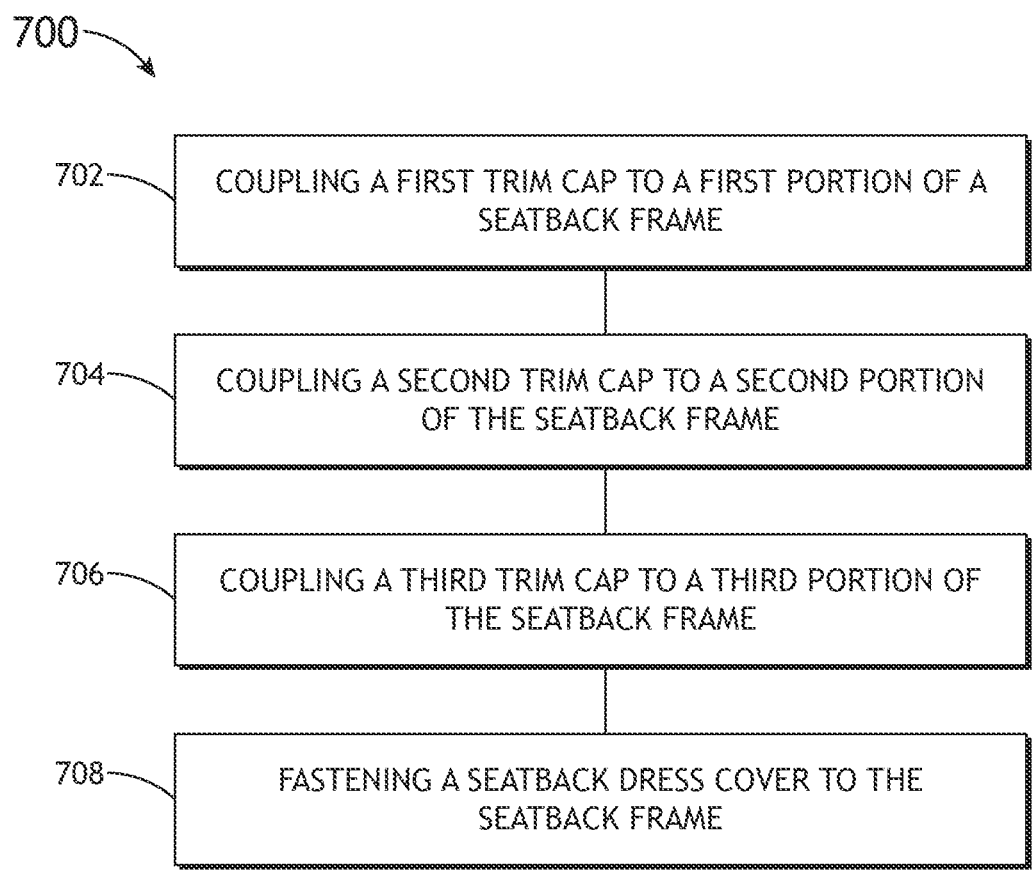
FIG. 7 illustrates a flowchart depicting a method or process for installing the modular seat cover attachment system, in accordance with one or more embodiments of the disclosure.

Referring to FIG. 4A, the one or more trim caps 302 may include one or more coat hook holes 312 configured to couple to a coat hook 311. For example, as shown in FIG. 3D, the one or more coat hook holes 312 may be configured to couple to a coat hook 311 via one or more screws (or bolts).

The one or more trim caps 302 and the one or more tabs 304 (hook tabs and/or panel tabs) may be formed of any material. For example, the one or more trim caps 302 and/or the one or more tabs 304 may be formed of a flexible material or combination of materials including, but not limited to, a flexible plastic (e.g., polycarbonate, acrylonitrile butadiene styrene, nylon, or the like), metal, composite material, wood, or the like. In general, the one or more trim caps 302 and/or the one or more tabs 304 may be configured to be formed from any flexible material (e.g., plastic, metal, or the like) configured to meet aviation guidelines and/or standards (e.g., for load-bearing requirements, burn requirements, or the like).

Referring to FIGS. 5A-5D, the modular seatback cover attachment system 300 may include an interlocking assembly. For example, the interlocking assembly may include one or more tab-and-groove assemblies, where each assembly includes a tab 500 and a groove 502. For example, the one or more trim caps 302 may include one or more tab-and-groove assemblies, where a set of tabs on the trim cap(s) 302 are keyed to a corresponding set of grooves on the trim cap(s) 302. In one instance, the side trim caps 302a, 302b may include one or more grooves 502 and the top trim cap 302c may include one or more tabs 500. In this regard, a first end of the left trim cap 302a may include a first groove 502 configured to receive a first tab 500a, and a first end of the right trim cap 302b may include a second groove 502 configured to receive a second tab 500b. In another instance, although not shown, the side trim caps 302a, 302b may include one or more tabs 500 and the top trim cap 302c may include one or more grooves 502. In this regard, a first end of the left trim cap 302a may include a first tab configured to couple to a first groove and a first end of the right trim cap 302b may include a second tab configured to couple to a second groove. Although FIGS. 5A-5D illustrate a specific tab-and-groove assembly configuration, it is noted that the one or more trim caps may include any configuration of tab-and-groove assembly. For example, each trim cap may include both tabs and grooves, where the tabs and grooves correspond to the opposing tabs and grooves on the mating trim cap. Therefore, FIGS. 5A-5D are provided merely for illustrative purposes and shall not be construed as limiting the scope of the present disclosure.

It is noted that the interlocking assembly may include any type of interlocking assembly configured to interlock the one or more trim caps 302. For example, the interlocking assembly may include one or more magnetic fasteners to interlock the one or more trim caps.

Referring to FIG. 6, the one or more trim caps 302 may include a lip 600 (or flange) along an edge of the one or more trim caps 302. For example, the lip 600 may be configured to overlap a portion of the dress cover 204. For instance, the lip 600 may be positioned along a front edge of the trim cap 302, such that the lip 600 is configured to overlap a portion of the dress cover 204. In this regard, the lip 600 is configured to protect the edge of the dress cover 204 and to prevent unintentional removal caused by external forces (e.g., rubbing of luggage, baggage, passengers, or the like).

Installing a seatback dress cover on an aircraft seat 100 using the modular seatback cover attachment system 300 may include one or more of the following steps of the method or process 700:

In a step 702, a first trim cap may be coupled to a first portion of the seatback frame. For example, a first trim cap 302a may include a left side trim cap 302a configured to couple to a left side portion 200a of the seatback frame. For instance, a force may be applied to engage the left side trim cap 302a with the left side portion 200a of the seatback frame 200 until the attachment system 300 interlocks with the seatback frame 200. In this regard, the force may be applied through an application of force on the attachment system 300 (e.g., the trim cap) in a specific direction until the attachment system 300 (e.g., tabs 304) interlocks with the seatback frame 200. For instance, the force may be applied in an inward direction towards the seatback frame 200. In this regard, the force may be applied to engage the seatback frame 200 with the trim cap until the tabs snap into place.

In a step 704, a second trim cap may be coupled to a second portion of the seatback frame. For example, a second trim cap 302b may include a right side trim cap 302b configured to couple to a right side portion 200b of the seatback frame. For instance, a force may be applied to engage the right side trim cap 302b with the right side portion 200b of the seatback frame 200 until the attachment system 300 interlocks with the seatback frame 200. In this regard, the force may be applied through an application of force on the attachment system 300 (e.g., the trim cap) in a specific direction until the attachment system 300 (e.g., tabs 304) interlocks with the seatback frame 200. For instance, the force may be applied in an inward direction towards the seatback frame 200. In this regard, the force may be applied to engage the seatback frame 200 with the trim cap until the tabs snap into place.

In a step 706, a third trim cap may be coupled to a third portion of the seatback frame. For example, a third trim cap 302c may include a top trim cap 302c configured to couple to a top portion 200c of the seatback frame. For instance, a force may be applied to engage the top trim cap 302c with the top portion 200c of the seatback frame 200 until the attachment system 300 interlocks with the seatback frame 200. In this regard, the force may be applied through an application of force on the attachment system 300 (e.g., the trim cap) in a specific direction until the attachment system 300 (e.g., tabs 304) interlocks with the seatback frame 200. For instance, the force may be applied in a downward direction towards the seatback frame 200. In this regard, the force may be applied to engage the seatback frame 200 with the trim cap until the tabs snap into place.

The attachment system 300 may interlock with the seatback frame 200 when a specific amount of force is applied. For example, the force may cause one or more components of the trim caps 302 to flex into place to cause the attachment system 300 to interlock with the seatback frame 200. In this regard, the attachment system 300 does not require an additional interlocking assembly to secure the attachment system 300 with seatback frame 200.

In a step 708, a seatback dress cover may be fastened to the seatback frame via the modular seatback cover attachment system. For example, as shown in FIG. 3B, the one or more fasteners 309 may include one or more hook-and-loop fasteners 309. For instance, the one or more panels 308 may be configured to couple to the one or more hook-and-loop fasteners via one or more rivet holes 310. In this regard, a first side (e.g., hook side or loop side) of the one or more hook-and-loop fasteners may be coupled to a front surface of the one or more panel tabs 308 via the one or more rivet holes 310 and corresponding second side (e.g., loop side or hook side) of the one or more hook-and-loop fasteners may be coupled to a back surface of the dress cover 204, such that by coupling the first side to the second side, the dress cover 204 may be fastened to the seatback frame 200 via the modular seatback cover attachment system 300.

It is noted the method or process 700 is not limited to the steps and/or sub-steps provided. The method or process 700 may include more or fewer steps and/or sub-steps. In addition, the method or process 700 may perform the steps and/or sub-steps simultaneously. Further, the method or process 700 may perform the steps and/or sub-steps sequentially, including in the order provided or an order other than provided. Therefore, the above description should not be interpreted as a limitation on the scope of the disclosure but merely an illustration.

Although embodiments of the disclosure illustrate coupling or uncoupling various components of the attachment system 300 from above, it is noted various components of the attachment system 300 may be coupled or uncoupled from a front or rear direction with enough applied force. Therefore, the above description should not be interpreted as a limitation on the scope of the disclosure but merely an illustration.

It is noted the modular seatback cover attachment system 300 may be configured to work with any aircraft seat 100 and/or any set of components in the aircraft seat 100. For example, the modular seatback cover attachment system 300 may be configured to take into account any changes in shape of the components of the aircraft seat 100 (e.g., within an x-y plane forming a seating surface for an occupant), where the changes in shape may be caused by or otherwise dependent on the location of the aircraft seat 100 within the aircraft cabin.

Although embodiments of the disclosure illustrate the modular seatback cover attachment system 300 being integrated with an aircraft seat 100 including a bezel, it is noted, however, that the attachment system 300 may be configured to work with an aircraft seat 100 without a bezel 206. For example, a seatback close out device (e.g., foam shroud) may be used to cover the back of the seatback frame.

Although embodiments of the disclosure illustrate the modular seatback cover attachment system 300 being integrated with the seatback frame of the aircraft seat, it is noted, however, that the attachment system 300 may be configured to couple to a portion of the seatback bezel 206 or the seatback dress cover 204.

Although embodiments of the disclosure illustrate the modular seatback cover attachment system 300 being integrated within the aircraft seat 100, it is noted, however, that the modular seatback cover attachment system 300 and/or components of the modular seatback cover attachment system 300 are not limited to the aviation environment and/or the aircraft components within the aviation environment. For example, the modular seatback cover attachment system 300 and/or components of the modular seatback cover attachment system 300 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the modular seatback cover attachment system 300 and/or components of the modular seatback cover attachment system 300 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat comprising:
a base assembly couplable to a floor of an aircraft cabin;
a seat frame coupled to the base assembly, the seat frame including a seatback frame and a seat pan frame;
a seat pan dress cover including at least one surface configured to conform to a corresponding surface of the seat pan frame;
a seatback dress cover including at least one surface configured to conform to a corresponding surface of the seatback frame; and
a modular seatback cover attachment system configured to couple the seatback dress cover to a portion of the seatback frame, the modular seatback cover attachment system comprising:
one or more trim caps, the one or more trim caps including one or more tabs configured to reversibly couple the one or more trim caps to one or more portions of a seatback frame, the one or more tabs including at least one of one or more hook tabs or one or more panel tabs, the one or more tabs including one or more hook tabs along a rear surface of the one or more trim caps and one or more panel tabs along a front surface of the one or more trim caps;
an interlocking assembly, the interlocking assembly configured to interlock the one or more trim caps with the seatback frame when the one or more trim caps are coupled to the seatback frame; and
a fastening assembly configured to couple the one or more trim caps to a portion of the seatback dress cover.

2. The aircraft seat of claim 1, wherein the one or more trim caps include at least one of a first side trim cap configured to couple to a first side portion of the seatback frame, a second side trim cap configured to couple to a second side portion of the seatback frame, and a top trim cap configured to couple to a top portion of the seat.

3. The aircraft seat of claim 1, wherein the one or more hook tabs and the one or more panels are offset.

4. The aircraft seat of claim 1, wherein the one or more trim caps are configured to engage with the seatback frame via a force applied in a direction inward.

5. The aircraft seat of claim 1, wherein the fastener assembly includes a hook-and-loop assembly.

6. The aircraft seat of claim 5, wherein the one or more panel tabs include one or more rivet holes, the one or more rivet holes configured to couple a portion of the hook-and-loop assembly to the one or more panel tabs of the one or more trim caps.

7. The aircraft seat of claim 6, wherein a first portion of the hook-and-loop assembly is couplable to the one or more panel tabs via the one or more rivet holes and a second portion of the hook-and-loop assembly is couplable to the seatback dress cover.

8. The aircraft seat of claim 1, wherein the one or more trim caps are formed of a plastic.

9. The aircraft seat of claim 1, wherein the seatback dress cover includes a seatback cover layer and a seatback cushion layer, the seatback cushion layer being integrated with the seatback cover layer.

10. The aircraft seat of claim 1, wherein the interlocking assembly includes a tab-and-groove assembly configured to interlock the one or more trim caps when the one or more trim caps are coupled to the seatback frame.

11. The aircraft seat of claim 10, wherein the tab-and-groove assembly includes one or more tabs, a first tab of the one or more tabs positioned on a first end of a first trim cap and a second tab of the one or more tabs positioned on a second end of the first trim cap.

12. The aircraft seat of claim 11, wherein the tab-and-groove assembly includes one or more grooves, a first groove of the one or more grooves positioned on an end of a second trim cap and a second groove of the one or more grooves positioned on an end of a third trim cap, the first tab on the first end of the first trim cap configured to interlock with the first groove on the end of the second trim cap, the second tab on the second end of the first trim cap configured to interlock with the second groove on the end of the third trim cap.

13. The aircraft seat of claim 1, wherein the one or more trim caps include a flange along a front edge of the one or more trim caps, the flange configured to overlap with a portion of the seatback dress cover to prevent an edge of the seatback dress cover from being unintentionally removed.

14. A modular seatback cover attachment system comprising:
one or more trim caps, the one or more trim caps including one or more tabs configured to reversibly couple the one or more trim caps to one or more portions of a seatback frame, the one or more tabs including at least of one or more hook tabs or one or more panel tabs, the one or more tabs including one or more hook tabs along a rear surface of the one or more trim caps and one or more panel tabs along a front surface of the one or more trim caps;
an interlocking assembly, the interlocking assembly configured to interlock the one or more trim caps with the seatback frame when the one or more trim caps are coupled to the seatback frame; and
a fastening assembly configured to couple the one or more trim caps to a portion of a seatback dress cover.

* * * * *